United States Patent [19]

Tokunaga et al.

[11] Patent Number: 4,583,827
[45] Date of Patent: Apr. 22, 1986

[54] OPTICAL LENS MOVING MECHANISM

[75] Inventors: Tomokazu Tokunaga; Jirou Kajino, both of Neyagawa; Masataka Izaki, Yawata, all of Japan

[73] Assignee: Matsushita Electric Industrial Co., Ltd., Osaka, Japan

[21] Appl. No.: 559,027

[22] Filed: Dec. 7, 1983

[30] Foreign Application Priority Data

| Dec. 7, 1982 | [JP] | Japan | 57-214908 |
| Mar. 25, 1983 | [JP] | Japan | 58-51250 |
| Mar. 25, 1983 | [JP] | Japan | 58-51249 |
| Apr. 15, 1983 | [JP] | Japan | 58-65693 |
| Apr. 15, 1983 | [JP] | Japan | 58-65694 |

[51] Int. Cl.$^4$ .............................. G02B 7/10
[52] U.S. Cl. ........................... 350/429; 350/255
[58] Field of Search ........................... 350/429, 255

[56] References Cited

U.S. PATENT DOCUMENTS

| 2,746,350 | 5/1956 | Hopkins | 350/429 |
| 3,267,828 | 8/1966 | Raab | 350/429 |
| 3,336,095 | 8/1967 | Thévenaz | 350/429 |
| 3,506,338 | 4/1970 | Holderbaum | 350/429 |
| 3,533,344 | 10/1970 | Thomas | 350/429 |
| 3,567,317 | 3/1971 | Plummer | 350/429 |
| 4,367,015 | 1/1983 | Waltuck et al. | 350/429 |
| 4,445,757 | 5/1984 | Enomoto et al. | 350/429 |

Primary Examiner—John K. Corbin
Assistant Examiner—Lotta Ben
Attorney, Agent, or Firm—Wenderoth, Lind & Ponack

[57] ABSTRACT

An optical lens moving mechanism for zoom lens systems using a plane cam is disclosed. A lens system having an optical axis comprises at least two lens groups. A first lens holder and a second lens holder which respectively hold the two lens groups are moved along a guide parallel with the optical axis by a rotational movement of the plane cam which moves on a plane parallel with the optical axis, to zoom the lens system. The mechanism further includes a zooming motor, a position detector, and a controller to control the rotation of the motor, according to the zooming position of the lens system, to achieve a uniform zooming speed.

22 Claims, 15 Drawing Figures

OPTICAL LENS MOVING MECHANISM

BACKGROUND OF THE INVENTION

1. Field of the Invention

This invention relates to an optical lens moving mechanism for zoom lens systems which are used in cameras including video cameras.

2. Description of the Prior Art

Conventional zoom lens systems employ a cylindrical cam having a helical cam groove for moving lenses in the direction of the optical axis of the lenses arranged in parallel to each other. The conventional lens system each comprises at least three coaxial cylinders: a cam cylinder; a fixed cylindrical body; and an operation ring. The cam cylinder is rotatably mounted in the fixed cylindrical body. The operation ring is rotatably mounted to the fixed cylindrical body and rotated by an operator to rotate the cam cylinder. The rotation of the cam cylinder is converted to a linear movement of lens holders holding the lenses so that the lenses move along the common optical axis.

Recently, demand has increased for a zoom lens system which is inexpensive, simple in structure, small in size, and highly precise in lens positioning. However, the conventional zoom lens system cannot fully satisfy the above demand because of the following reasons.

The cam cylinder and the fixed cylindrical body must be machined very precisely for realizing a high precision positioning of each lens, so that the number of parts cannot be reduced much and the machining cost is high. The cam cylinder will be deformed or distorted when a cam groove is formed thereon by cutting. The rotational angle of the cam groove cannot be made large to minimize the distortion of the cam cylinder. Due to the small rotational angle of the cam groove, the cam shift curve is keen, so that the cam movement is not smooth. Also, since the amount of cam movement with respect to the rotated angle of the cam cylinder is great, a small error of the cam causes a large error of the lens movement. Further, the conventional zoom lens system cannot be easily set up due to its complex structure.

SUMMARY OF THE INVENTION

A primary object of the present invention is to employ a plane cam mechanism for an optical lens moving mechanism and provide a zoom lens system which is inexpensive, compact, highly precise in moving and positioning lenses, and simply constructed.

The optical lens moving mechanism of the present invention basically comprises: a lens system including at least a first lens group and a second lens group and having an optical axis; first and second lens holding means for holding the first and second lens groups, respectively, the first and second lens holding means being movable along the optical axis of the lens system; guide means for slidably mounting the first and second lens holding means so that the first and second lens holding means are movable along the optical axis of the lens system; first drive means rotatable on a plane parallel with the optical axis of the lens system for moving the first lens holding means along the optical axis; and second drive means rotatable on a plane parallel with the optical axis of the lens system for moving the second holding means along the optical axis. The first and second drive means may be provided on one rotating means so that they can rotate synchronously with each other. For the simplification in structure of the mechanism, it is preferable to employ plane cams provided on one rotating means as the first and second drive means. The optical lens moving mechanism of the invention may further comprise a zooming motor for driving the driving means, and a uniform zooming speed control means for making the zooming speed of the zoom lens system constant.

The above and other objects and features of the present invention will become more apparent from the following detailed description taken together with the accompanying drawings.

DESCRIPTION OF THE PREFERRED EMBODIMENTS

Figure 1:
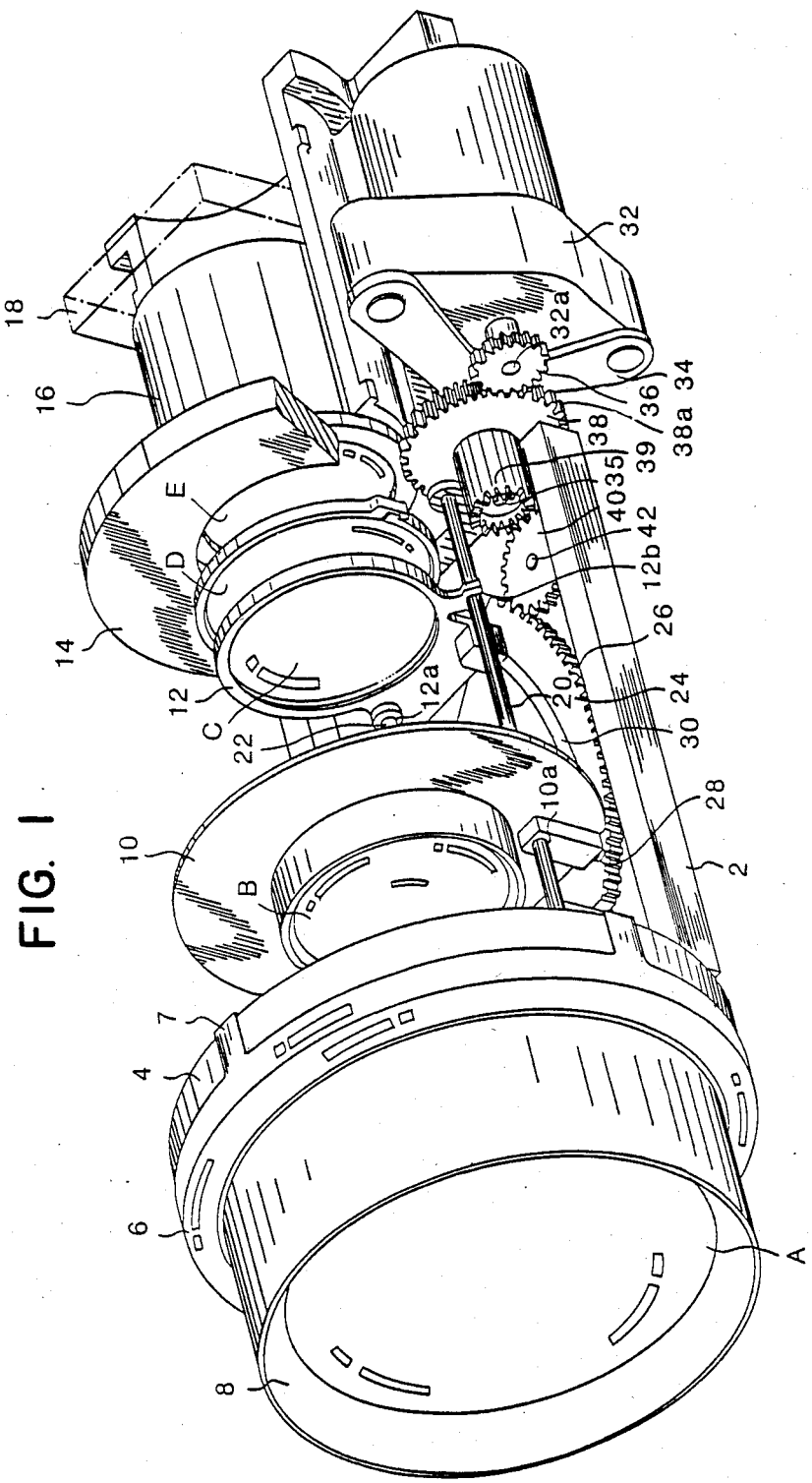
FIG. 1 is a perspective view showing a first embodiment of an optical lens transfer mechanism according to the present invention.

Referring to FIG. 1, a lens system is composed of a focusing lens group A supported by a focus lens holder 8, a first lens group B supported by a first lens holder 10, a second lens group C supported by a second lens holder 12, a fixed lens D, a master lens group E supported by a master lens holder 16. A chassis 2 mounts thereon the lens system, an iris 14, and a filter 18. The focus lens holder 8 is rotatably mounted to a fixed ring 4 which is formed integrally with the chassis 2. An end of the focus lens holder 8 is a facing cam (not shown) and contacts an end of the fixed ring 4 so that the focus lens holder 8 can move along the optical axis of the lens system as it is rotated.

The first lens holder 10 and the second lens holder 12 are slidably mounted to a pair of guide poles 20, 22 to be movable along the optical axis. The first lens holder 10 has an opening (not shown) for inserting thereinto the guide pole 22 and a slot 10a for inserting thereinto the guide pole 20. Similarly, the second lens holder 12 has an opening 12b for inserting thereinto the guide pole 20 and a slot 12a for inserting thereinto the guide pole 22.

Figure 2:
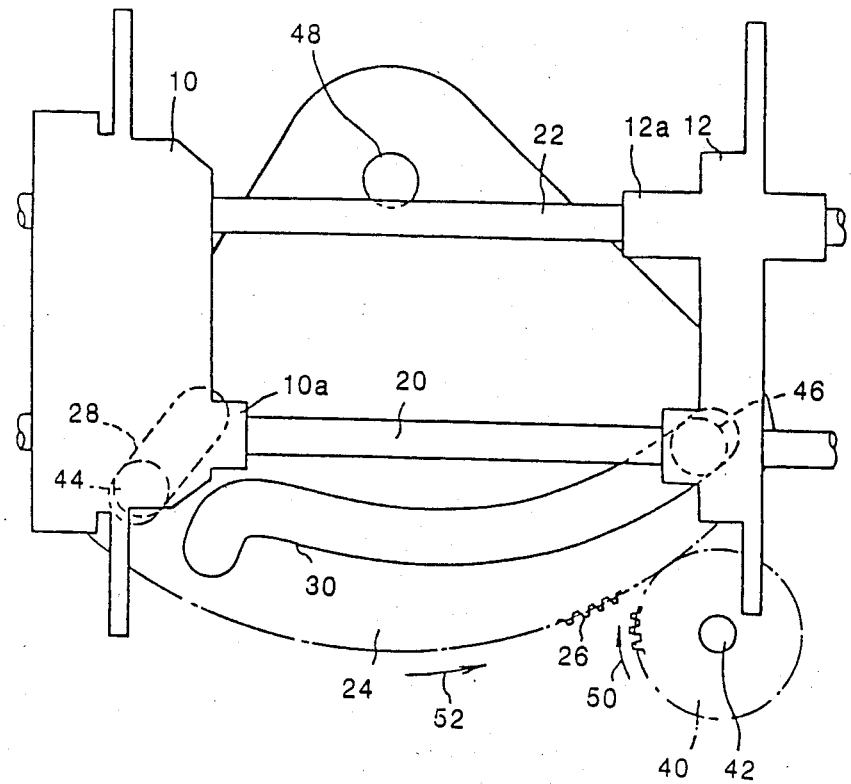
FIGS. 2 and 3 are schematic plan views of the mechanism of FIG. 1.

A cam plate 24 which is turnably mounted to a shaft 48 as shown in FIG. 2 (the shaft 48 is fixed to the chassis 2 shown in FIG. 1) has a first cam groove 28 and a second cam groove 30. As shown in FIG. 2, a first cam follower pin 44 secured to the first lens holder 10 is inserted into the first cam groove 28, and a second cam follower pin 46 secured to the second lens holder 12 is inserted into the second cam groove 30.

As shown in FIG. 1, a zooming motor 32 is mounted on a motor plate 34 secured to the chassis 2. A motor gear 36 fixed to a motor shaft 32a engages with a first drive gear 38 rotatably mounted to a first shaft 35 which is secured to the motor plate 34. A crown gear 39 is formed integrally with the first drive gear 38 to share the first shaft 35 and engages with a second drive gear 40 rotatably mounted to a second shaft 42 which is secured to the chassis 2. The second drive gear 40 engages with a driven gear 26 formed at an end of the cam plate 24.

Figure 3:
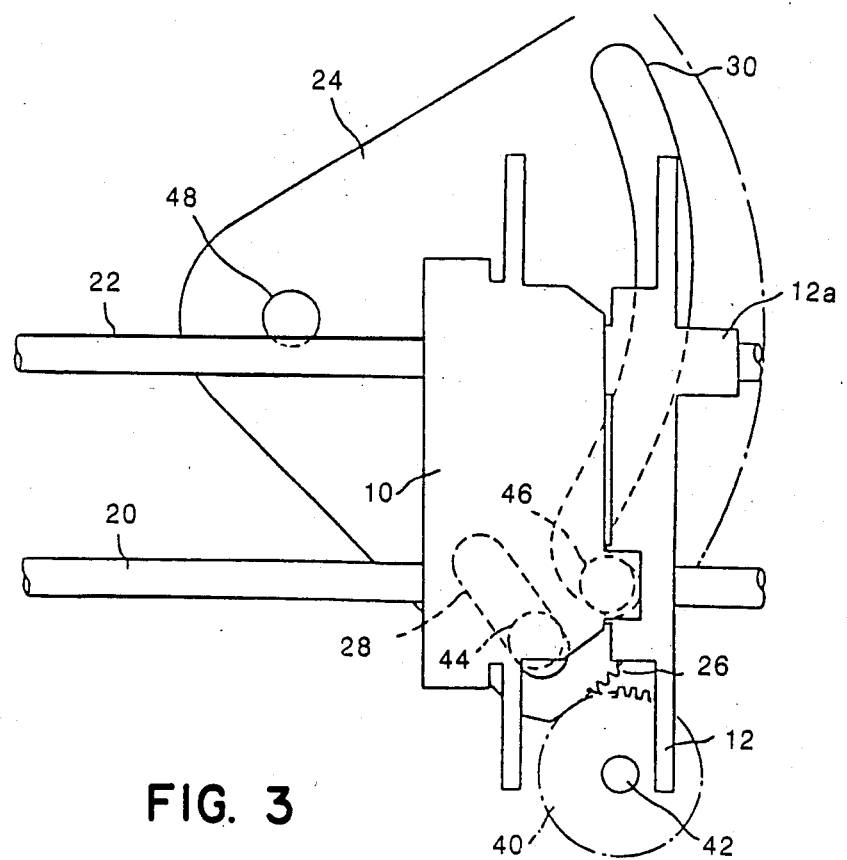

Referring now to FIGS. 2 and 3, the basic operation of the mechanism of the first embodiment of the invention will be described.

FIG. 2 shows a relative positional relation among the cam plate 24, the first lens holder 10 and the second lens holder 12 when the zoom lens system is in a wide-angle position.

The first cam follower pin 44 secured to the first lens holder 10 is inserted into the first cam groove 28 which is lengthened in the radial direction with respect to the shaft 48. The second cam follower pin 46 secured to the second lens holder 12 is inserted into the second cam groove 30 which is lengthened approximately in the circumferential direction with respect to the shaft 48. The shaft 48 is a rotating member, as seen in FIGS. 2 and 3, provided on a rotational axis perpendicular to, but spaced from, the optical axis. If the second drive gear 40 is rotated in the direction of arrow 50 by the rotation of the zooming motor 32 (FIG. 1), the cam plate 24 turns in the direction of arrow 52, so that the first lens holder 10 and the second lens holder 12 are moved along the optical axis to reach a tele-angle position as shown in FIG. 3.

Referring next to FIGS. 4 to 10, control of the zooming speed will be described.

Figure 5:
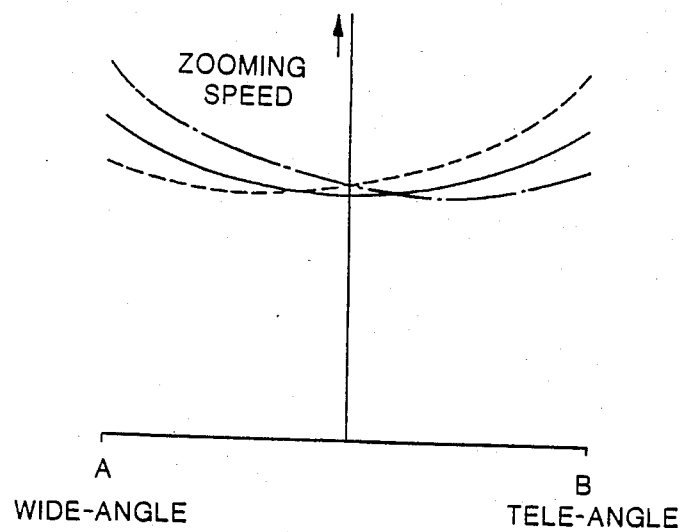
FIG. 5 is a graph showing variation of the zooming speed when a drive means turns at a constant speed.
Figure 4:
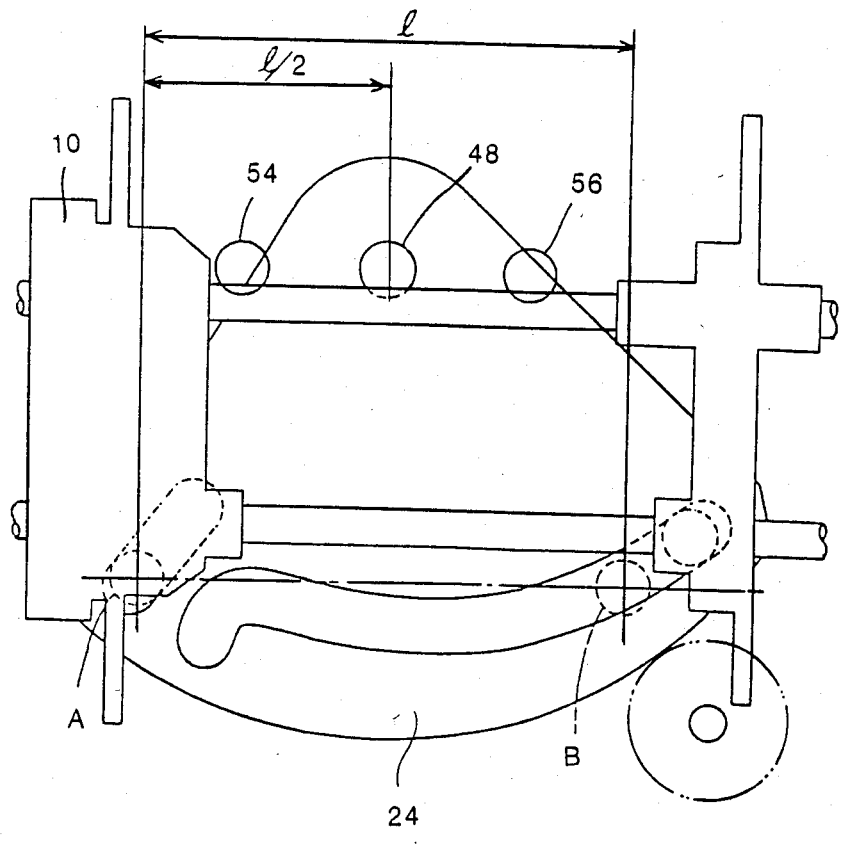
FIG. 4 is a schematic plan view showing a slidable distance of a first lens holder.

FIG. 4 shows a movable range l of the first lens holder 10. FIG. 5 shows variations of the zooming speed which is the moving speed of the first lens holder 10, when the cam plate 24 is turned at a constant speed. The first cam follower pin 44 can move between a wide-angle position A and a tele-angle position B. As shown in FIG. 4, there are three points to place the turning axis of the cam plate 24: a first point 48 is on the center line between the positions A and B; a second point 54 is on a line shifted from the center line to the wide angle position A; a third point 56 is on a line shifted from the center line to the tele-angle position B. The zoom speed varies in each case when the cam plate 24 turns with respect to the points 48, 54 or 56 as shown in FIG. 5. The variation of the zooming speed with respect to the first point 48 is shown by a solid curved line which is symmetrical with respect to the center position between the wide-angle position A and the tele-angle position B. The variation of the zooming speed with respect to the second point 54 is shown by a curved dash-dash line. The zooming speed on the side of the tele-angle position B is larger than that on the side of the wide-angle position A. The variation of the zooming speed with respect to the third point 56 is shown by a curved dot-dash line. The zooming speed on the side of the wide-angle position A is larger than that on the side of the tele-angle position side B.

Usually, the zooming speed of a zoom lens system is required to be constant throughout the zoomable range between the wide angle position A and the tele-angle position B. Therefore, the position of the turning axis of the cam plate 24 is preferably placed at the point 48 on the center line between the wide angle position A and the tele-angle position B as shown in FIG. 4.

Even if the turning axis of the cam plate 24 is placed at the point 48 as above, the zooming speed is still not constant if the turning speed of the cam plate 24 is constant, as shown by the solid line in FIG. 5. It is therefore necessary in order to make the zooming speed constant to vary the turning speed of the cam plate 24 in such a way as to follow a curve opposite to the curve shown by the solid line in FIG. 5. In other words, the cam plate 24 is controlled in such a way that, starting from the wide-angle position A, the turning speed gradually increases until the first lens holder 10 reaches the center position between the wide angle position A and the tele-angle position B, and thereafter the turning speed gradually reduces.

This control operation can be achieved by providing a position or speed detecting means for either detecting the position of the cam plate 24 or the first lens holder 10 or detecting the turning speed of the cam plate 24 or the moving speed of the first lens holder 10. For this operation, it is necessary to provide control means for controlling the rotation of the zooming motor 32 by applying thereto a control which responds to an output signal from the detecting means.

Figure 7:
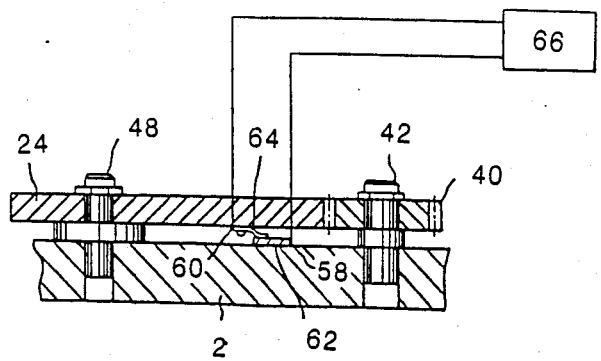
FIG. 7 is a sectional view along line I—I in FIG. 6.
Figure 6:
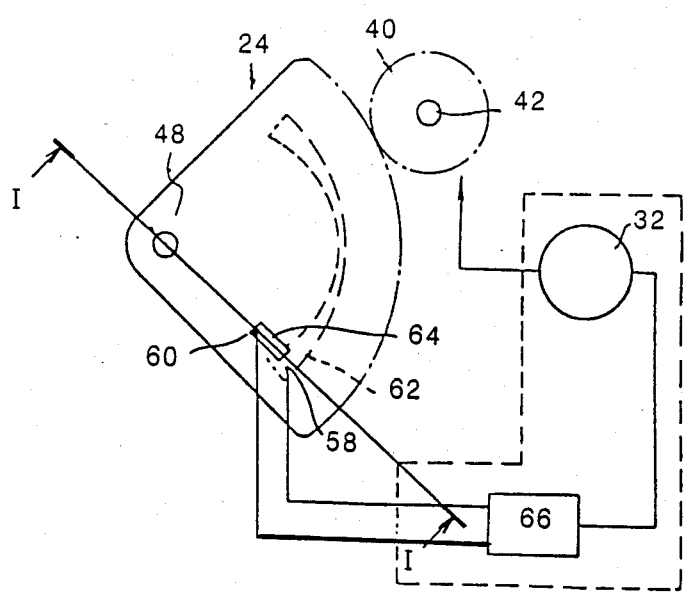
FIG. 6 is a schematic plan view showing an embodiment of a uniform zooming speed mechanism according to the present invention.
Figure 8:
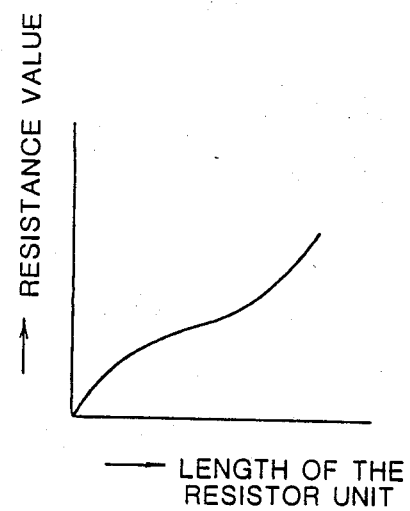
FIG. 8 is a graph showing the relation between length and resistance value of a resistance unit.
Figure 9:
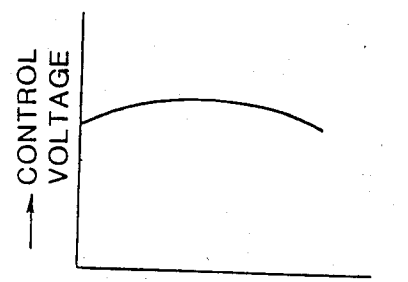
FIG. 9 is a graph showing the characteristic curve of a control circuit.

Referring to FIGS. 6 to 10, an embodiment for realizing a uniform zooming speed will be described. FIG. 6 is a schematic plan view showing an embodiment of a uniform zooming speed mechanism according to the present invention. FIG. 7 is a sectional view along line I—I of the mechanism of FIG. 6. As seen in FIG. 7, an electrical resistor unit 62 is provided on the upper surface of the chassis 2, and an electrical conductor 64 is provided on the lower surface of the cam plate 24. An end of the conductor 64 is slidably contacting with the resistor unit 62. The other end of the conductor 64 and one end of the resistor unit 62 are respectively connected with inputs of a control circuit 66 which detects the resistance value between the other end of the conductor 64 and the one end of the resistor unit 62 to detect the position of the cam plate 24. The resistor unit 62 has a shape which is lengthened in the approximately circumferential direction with respect to the turning axis 48 of the cam plate 24 and the width of the resistor unit 62 is gradually widened from the center to both ends thereof, as can be seen from FIG. 6, so that the resistor unit 62 has a characteristic curve as shown in FIG. 8. The control circuit 66 produces a control voltage which varies as shown in FIG. 9 according to the detected resistance value which varies as shown in FIG. 8 as the cam plate 24 turns. The control voltage is applied to the zooming motor 32 to control the rotational speed of the zooming motor 32. Since the control circuit 66 having the above described function can be easily realized by the known technique, further detailed description will be omitted.

Figure 10:
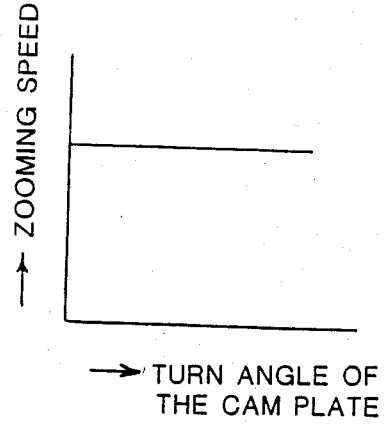
FIG. 10 is a graph showing variation of the zooming speed with respect to the turning motion of the drive means.

By constructing as described above and by properly designing the shape and resistance value of the resistor unit 62 and the circuit constant of the control circuit 66, a uniform zooming speed as shown in FIG. 10 can be realized.

It is needless to say that other various known techniques can be used for the detecting means. For example, sensors such as a magnetic sensor, an electromagnetic sensor, and an optical sensor can replace the resistor unit 62 and the conductor 64. It is also apparent that the zooming position or the zooming speed can be detected at any other positions such as the first or second lens holder, the drive gears, and the zooming motor itself.

Referring now to FIGS. 11 to 15, an embodiment of a manual zooming mechanism according to the present invention will be described.

Figure 11:
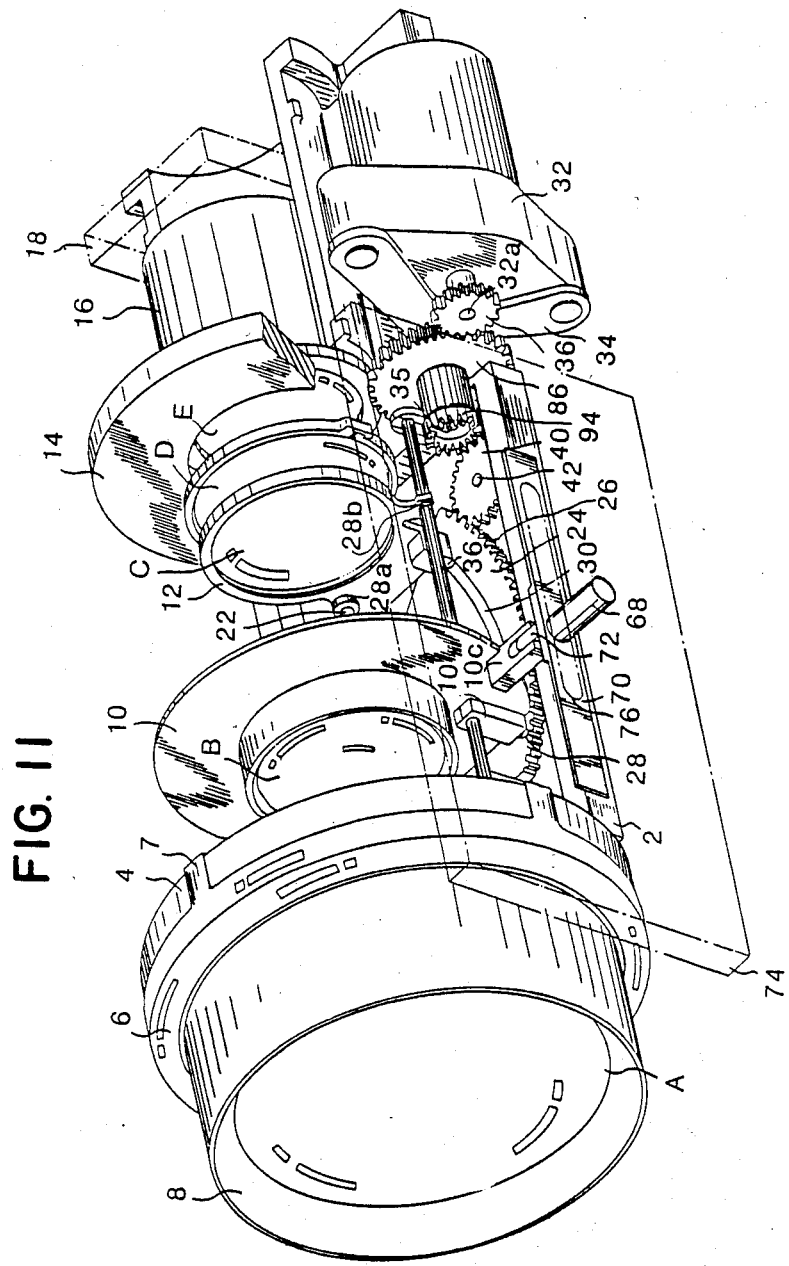
FIG. 11 is a perspective view showing a second embodiment of a manually zoomable mechanism according to the present invention.
Figure 14:
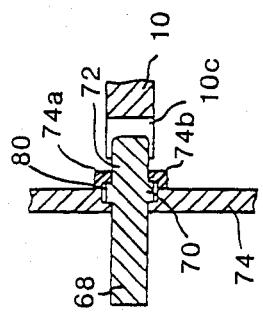
FIG. 14 is a sectional view along line III—III in FIG. 12.
Figure 13:
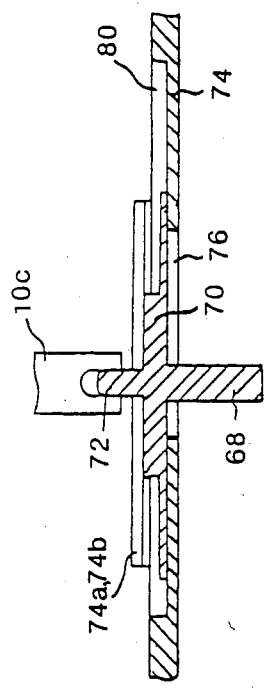
FIG. 13 is a sectional view along line II—II in FIG. 12.
Figure 12:
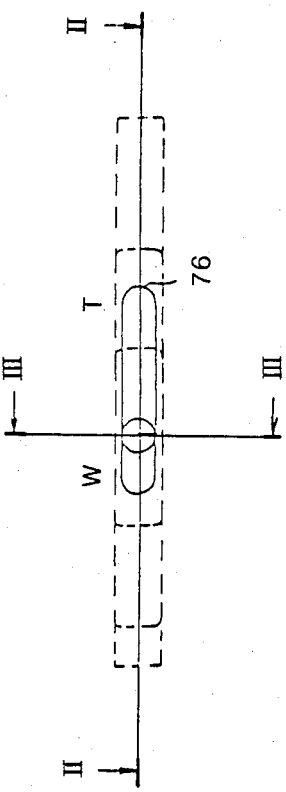
FIG. 12 is a schematic plan view showing an embodiment of an operating member.

FIG. 11 is a perspective view showing an embodiment of an optical lens moving mechanism having a manual zooming function. FIG. 12 is a schematic plan view showing an operating member 70 used in the mechanism of FIG. 11. FIGS. 13 and 14 are sectional view along lines II—II and III—III, respectively, in FIG. 12. In FIGS. 13 and 14, the operating member 70 has a projection 72 and an operating nob 68. The projection 72 is inserted into a groove of a connection member 10c which is secured to the first lens holder 10. The nob 68 is projected through a slot 76 provided on a housing 74 having a groove 80 in which the operating member 70 is slidably mounted. A pair of guide members 74a, 74b are provided on the housing 74 to allow the operating member 70 to slide smoothly in the groove 80. "W" and "T" in FIG. 12 are indices printed on the housing 74 to show wide and tele-angle positions.

Figure 15:
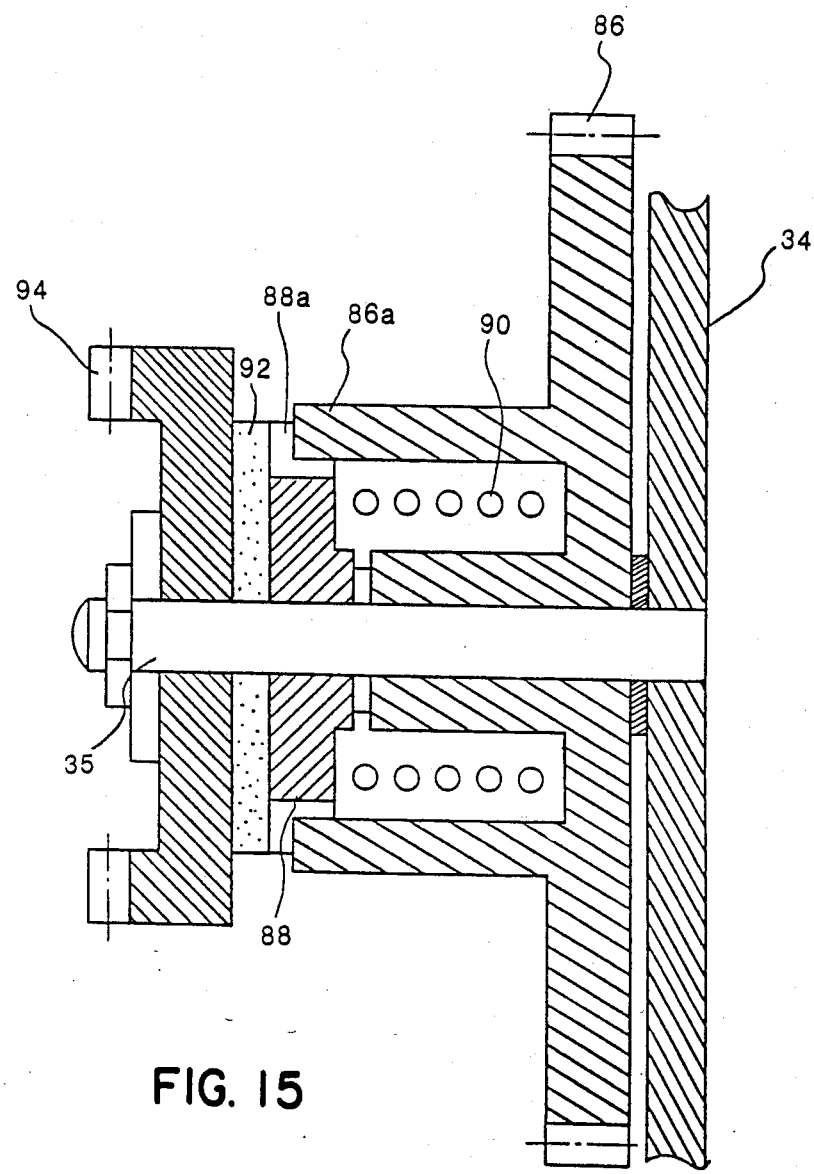
FIG. 15 is a sectional view showing an embodiment of a friction mechanism.

FIG. 15 is a sectional view showing a friction mechanism used in the mechanism in FIG. 11. A first drive gear 86 and a crown gear 94 are rotatably mounted on the shaft 35. A friction member 92 is rotatably mounted on the shaft 35 between the first drive gear 86 and the crown gear 94 and is pressed to the crown gear 94 via a spring tray 88 by the force of a spring 90 mounted in the first drive gear 86. A projection 86a of the first drive gear 86 is fitted to a groove 88a provided on the spring tray 88. As shown in FIG. 11, the rotational power of the motor 32 is transmitted to the cam plate 24 through the motor gear 36, the first drive gear 86, the friction member 92 (FIG. 15), the crown gear 94, the second drive gear 40, and the driven gear 26. On the other hand, when the operating member 70 is slid, the sliding motion is converted to turning motion of the cam plate 24 by the first cam groove 28. The turning motion is in turn transmitted to the crown gear 94 via the second drive gear 40. However, the rotation of the crown gear 94 is not transmitted to the first drive gear 86 because the friction member 92 slips at the surface which is contacted with the crown gear 94.

Referred embodiments of the present invention have been described hereinbefore, but it should be noted that the above description is merely for explanation. It should be understood that various modifications and additions are possible without departing from the scope of the present invention. Therefore, the scope of the present invention should be considered as defined in the appended claims.

What is claimed is:

1. An optical lens moving mechanism for zoom lens systems comprising:
   a lens system including at least a first lens group and a second lens group and having an optical axis;
   first lens holding means for holding said first lens group and being movable along said optical axis;
   second lens holding means for holding said second lens group and being movable along said optical axis;
   guide means for slidably mounting said first and second lens holding means so that said first and second lens holding means are movable along said optical axis;
   a rotating member, provided on a rotational axis perpendicular to but spaced from said optical axis, provided with a first cam and a second cam;
   said first cam being connected with a first cam follower, mounted on said first lens holding means, and moving said first cam follower in the radial direction with respect to the rotational axis of said rotating member; and
   said second cam being connected with a second cam follower, mounted on said second lens holding means, and moving said second cam follower in the circumferential direction with respect to the rotational axis of said rotating member.

2. The mechanism according to claim 1, further comprising:
   a motor means for driving said rotating member.

3. The mechanism according to claim 2, further comprising:
   position detecting means for detecting a rotational position of said rotating member; and
   control circuit means, responsive to an output signal of said position detecting means, for producing a control voltage which is applied to said motor means to control the rotation of said motor means, thereby keeping the zooming speed constant.

4. The mechanism according to claim 2, further comprising:
   operating means for manually moving said first lens holding means along said optical axis; and
   a gear means for transmitting the rotation of said motor means to said rotating member;
   said gear means having friction means for transmitting the rotation of said motor means to said rotating member, whereby the rotation of said rotating member is not transmitted to said motor means by slipping.

5. An optical lens moving mechanism for zoom lens systems comprising:
   a lens system including at least a first lens group and a second lens group and having an optical axis;
   first lens holding means for holding said first lens group and being movable along said optical axis;
   second lens holding means for holding said second lens group and being movable along said optical axis;
   guide means for slidably mounting said first and second lens holding means so that said first and second lens holding means are movable along said optical axis; and
   a rotating member, provided on a rotational axis perpendicular to but spaced from said optical axis, with a first cam groove means and a second cam groove means for moving said first and second lens holding means, respectively, along said optical axis;
   wherein said first cam groove means extends in the radial direction with respect to the rotational axis of said rotating member and said second cam groove means extends in the circumferential direction with respect to said rotational axis.

6. The mechanism according to claim 5, further comprising:

a motor means for driving said rotating member.

7. The mechanism according to claim 6, further comprising:

position detecting means for detecting a rotational position of said rotating member; and control circuit means, responsive to an output signal of said position detecting means, for producing a control voltage which is applied to said motor means to control the rotation of said motor means, thereby keeping the zooming speed constant.

8. The mechanism according to claim 6, further comprising:

operation means for manually moving said first lens holding means along said optical axis; and a gear means for transmitting the rotation of said motor means to said rotating member;

said gear means having friction means for transmitting the rotation of said motor means to said rotating member, whereby the rotation of said rotating member is not transmitted to said motor means by slipping.

9. An optical lens moving mechanism for zoom lens systems comprising:

a lens system including at least a first lens group and a second lens group and having an optical axis;

first lens holding means for holding said first lens group and being movable along said optical axis;

second lens holding means for holding said second lens group and being movable along said optical axis;

guide means for slidably mounting said first and second lens holding means so that said first and second lens holding means are movable along said optical axis; and a rotating member, provided on a rotational axis perpendicular to but spaced from said optical axis, with a first cam groove means and a second cam groove means for moving said first and second lens holding means, respectively, along said optical axis;

wherein the rotational axis of said rotating member is placed on a line which equally divides a movable range of said first lens holding means into two ranges.

10. The mechanism according to claim 9, further comprising:

a motor means for driving said rotating member.

11. The mechanism according to claim 10, further comprising:

position detecting means for detecting a rotational position of said rotating member; and control circuit means, responsive to an output signal of said position detecting means, for producing a control voltage which is applied to said motor means to control the rotation of said motor means, thereby keeping the zooming speed constant.

12. The mechanism according to claim 10, further comprising:

operating means for manually moving said first lens holding means along said optical axis; and a gear means for transmitting the rotation of said motor means to said rotating member;

said gear means having friction means for transmitting the rotation of said motor means to said rotating member, whereby the rotation of said rotating member is not transmitted to said motor means by slipping.

13. An optical lens moving mechanism for zoom lens systems comprising:

a lens system including at least a first lens group and a second lens group and having an optical axis;

first lens holding means for holding said first lens group and being movable along said optical axis;

second lens holding means for holding said second lens group and being movable along said optical axis;

guide means for slidably mounting said first and second lens holding means so that said first and second lens holding means are movable along said optical axis;

a rotating member, provided on a rotational axis perpendicular to but spaced from said optical axis, with a first cam and a second cam;

said first cam being connected with a first cam follower, mounted on said first lens holding means, and moving said first cam follower in the radial direction with respect to the rotational axis of said rotating member;

said second cam being connected with a second cam follower, mounted on said second lens holding means, and moving said second cam follower in the circumferential direction with respect to the rotational axis of said rotating member; and a gear formed at an end of said rotating member.

14. The mechanism according to claim 13, wherein said gear has a friction means for transmitting rotation to said rotating member, whereby the rotation of said rotating member is not transmitted by slipping.

15. The mechanism according to claim 14, further comprising:

operating means for manually moving said first lens holding means along said optical axis.

16. The mechanism according to claim 13, further comprising:

position detecting means for detecting a rotational position of said rotating member; and control circuit means, responsive to an output signal of said position detecting means, for producing a control voltage, thereby keeping the zooming speed constant.

17. An optical lens moving mechanism for zoom lens systems comprising:

a lens system including at least a first lens group and a second lens group and having an optical axis;

first lens holding means for holding said first lens group and being movable along said optical axis;

second lens holding means for holding said second lens group and being movable along said optical axis;

guide means for slidably mounting said first and second lens holding means so that said first and second lens holding means are movable along said optical axis;

a rotating member, provided on a rotational axis perpendicular to but spaced from said optical axis, with a first cam and a second cam;

said first cam being connected with a first cam follower, mounted on said first lens holding means, and moving said first cam follower in the radial direction with respect to the rotational axis of said rotating member;

said second cam being connected with a second cam follower, mounted on said second lens holding means, and moving said second cam follower in the circumferential direction with respect to the rotational axis of said rotating member;

a motor means for driving said rotating member; and a position detecting means for detecting a rotational position of said rotating member, said position detecting means including an electrical resistor unit having a width gradually widened from the center to both ends, thereby extending in the approximately circumferential direction with respect to the rotational axis of said rotating member, and an electrical conductor which is provided on said rotating member so as to be in slidable contact with said electrical resistor unit.

18. The mechanism according to claim 17, further comprising:
a control circuit means for detecting an electrical resistance between an end of said electrical resistor unit and said electrical conductor and for producing a control voltage responsive to said electrical resistance, said control voltage being applied to said motor means to control the rotation of said motor means, thereby keeping the zooming speed constant.

19. The mechanism according to claim 18, further comprising: operating means for manually moving said first lens holding means along said optical axis; and
a first gear means for transmitting the rotation of said motor means to said rotating member, said first gear means having friction means for transmitting the rotation of said motor means to said rotating member, whereby the rotation of said rotating member is not transmitted to said motor means by slipping.

20. The mechanism according to claim 19, wherein said rotating member is provided at an end thereof with a second gear means for engaging with said first gear means.

21. An optical lens moving mechanism for zoom lens systems comprising:
a lens system including at least a first lens group and a second lens group and having an optical axis;
first lens holding means for holding said first lens group and being movable along said optical axis;
second lens holding means for holding said second lens group and being movable along said optical axis;
guide means for slidably mounting said first and second lens holding means so that said first and second lens holding means are movable along said optical axis;
first drive means, rotatable on a plane parallel with said optical axis, for moving said first lens holding means along said optical axis;
second drive means, rotatable on a plane parallel with said optical axis, for moving said second lens holding means along said optical axis;
wherein said first drive means has a first cam and said second drive means has a second cam;
wherein said first and second cams are provided on one rotating member;
wherein said first and second cams are groove cams; and
wherein said first groove cam extends in the radial direction with respect to the rotational axis of said rotatig member and said second groove cam extends in the circumferential direction with respect to said rotational axis of said rotating member.

22. An optical lens moving mechanism for zoom lens systems comprising:
a lens system including at least a first lens group and a second lens group and having an optical axis;
first lens holding means for holding said first lens group and being movable along said optical axis;
second lens holding means for holding said second lens group and being movable along said optical axis;
guide means for slidably mounting said first and second lens holding means so that said first and second lens holding means are movable along said optical axis;
first drive means, rotatable on a plane parallel with said optical axis, for moving said first lens holding means along said optical axis;
second drive means rotatable on a plane parallel with said optical axis, for moving said second lens holding means along said optical axis;
wherein said first drive means has a first cam and said second drive means has a second cam;
wherein said first and second cams are provided on one rotating member;
wherein the rotational axis of said rotating member is placed on a line which equally divides a movable range of said first lens holding means into two ranges.

* * * * *